Figure 1:
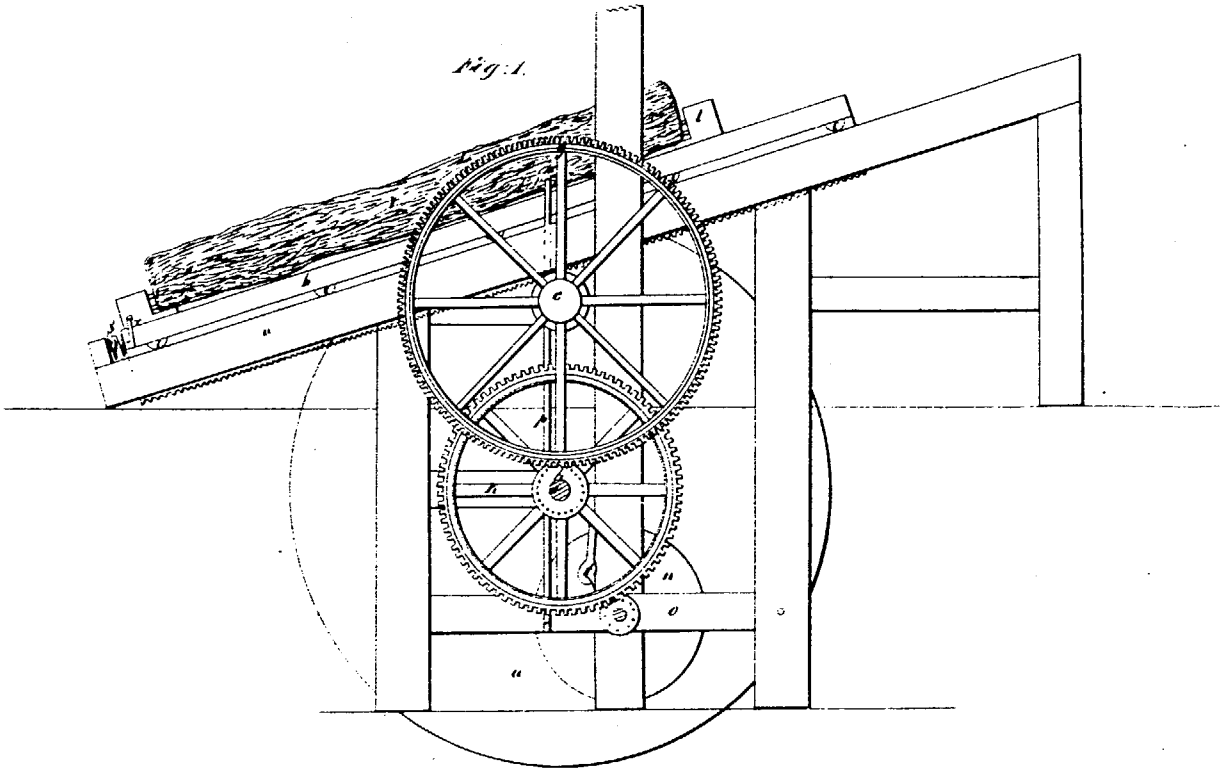
Figure 3:
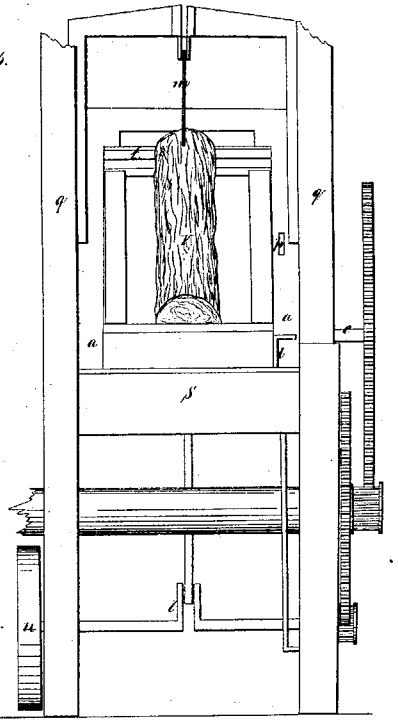
Figure 2:
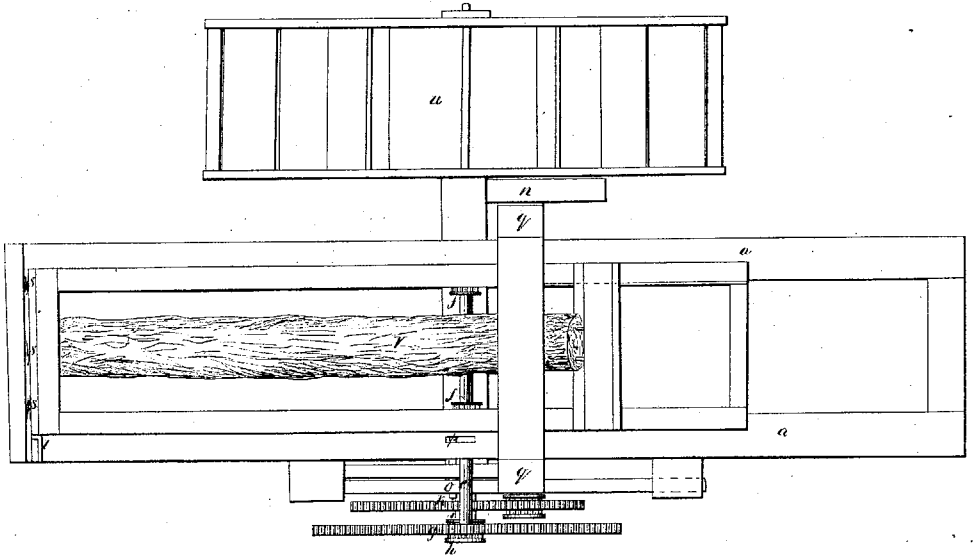

6287X

2 Sheets-Sheet 1.

D. Stem,

Reciprocating Saw Mill.

Patented Dec. 14, 1830.

6287X

D. Stem,

Reciprocating Saw Mill.

Patented Dec. 14, 1830.

A.M. PHOTO-LITHO. CO. N.Y. (OSBORNE'S PROCESS)

David Stem, A Citizen of

Letters Patent.

The schedule referred to in these Letters Patent and making
part of the same, containing a description in the words of the said
David Stem, himself of his improvement in the art of Sawing
Timber.

To all to whom these presents shall come.
Be it known that I David Stem of the County of Vanderburgh.
and State of Indianna, have invented a new and useful
improvement in the art of Sawing Timber. and that the fol-
lowing is a full and exact description of the construction
and operation of the said improvement (or machine)
as invented or improved by me. There are two large beams
placed permanent in an inclined position of seven feet to
twenty four in length, on which the carriage runs. There are
small wheels in the carriage, which wheels run on those
permanent beams, there is a rag or straight timber with cogs
on each side of the carriage, which are placed under the carriage
so as to lap on each side of those timbers to guide her up and
down straight. The rag or cog'd part of the carriage, as she
moves, runs over the shaft of the wheel called the stop wheel,
which shaft has two wallowers, on, and extends across under
those permanent timbers so that the wallowers meet the rag
or cogs of the carriage on both sides, inclining to turn the stop
wheel, but have those wallowers, so that the rung of one,
ranges with the space of the other. If this shaft be casting the
rungs are cast on, if wood, they are cut in, or should be iron
rungs, bound to the shaft; those wallowers have eleven rungs
in each one, and the stop wheel has 176 Cogs; this wheel runs
into a wallower of twenty two rungs; which is on the shaft
of the

[illegible]

X6287 of the wheel, called the swift wheel, which has 196 cogs, which
runs into a wallower of eleven rungs on a shaft, that has
a crank to draw the saw, There is also a small fly wheel on
this shaft to cause the crank to pass her center, and on the
end of the shaft opposite to the crank, the gudgeon rests on
a horizontal timber, that has a joint in a post at one end
and will raise and fall at the other end, to shoulders or
catches in a post to drop it out of gearing; and in gearing
which is done by a lever drawn between the fender posts
when dropped out of gearing, the carriage is run back by
the step wheel; the lever when raised is hooked fast to the
permanent timbers, and there is a catch on the carriage
to unhook it, just at the time the saw has run her cut out.
There is a post set in the permanent beams, with a spring on
it for the carriage to stop against. The moveable head block must
be at the back of the saw, that her stopping place will suit all
lengths of timber; all the cogs of wheels and rungs of wallowers
must be two inches cog and space which regulates her feed
to one fourth of an inch. To give her less feed the wallower on the
shaft of the swift wheel must be lessened, which is necessa-
ry to suit all timbers; A short crank, with quick motion and
less feed is preferred in the above plan. The place of applying
the power to run her, is to the swift wheel, when horse power
which is the principal intention of her construction, is applied,
the gearing must be attached by a wallower to her cogs, if by
water, by putting a water wheel on her shaft.

Witnesses

[illegible] C. J. Bradley
[illegible] John Hopkins

David Stein